United States Patent
Dev Gupta et al.

(10) Patent No.: US 11,861,855 B2
(45) Date of Patent: Jan. 2, 2024

(54) SYSTEM AND METHOD FOR AERIAL TO GROUND REGISTRATION

(71) Applicant: DEKA Products Limited Partnership, Manchester, NH (US)

(72) Inventors: Shikhar Dev Gupta, Shahjahanpur (IN); Kartik Khanna, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 170 days.

(21) Appl. No.: 17/304,206

(22) Filed: Jun. 16, 2021

(65) Prior Publication Data
US 2021/0398300 A1    Dec. 23, 2021

Related U.S. Application Data

(60) Provisional application No. 63/040,789, filed on Jun. 18, 2020.

(51) Int. Cl.
*G06T 7/33* (2017.01)
*G01S 17/89* (2020.01)
*G06T 19/20* (2011.01)
*G06T 7/73* (2017.01)

(52) U.S. Cl.
CPC ............ *G06T 7/33* (2017.01); *G01S 17/89* (2013.01); *G06T 7/73* (2017.01); *G06T 19/20* (2013.01); *G06T 2207/10028* (2013.01); *G06T 2207/10032* (2013.01); *G06T 2207/30181* (2013.01); *G06T 2219/2004* (2013.01)

(58) Field of Classification Search
CPC . G06T 7/33; G06T 19/20; G06T 2207/10028; G06T 2219/2004; G01S 17/89
See application file for complete search history.

(56) References Cited

U.S. PATENT DOCUMENTS

| | | | |
|---|---|---|---|
| 10,452,949 B2* | 10/2019 | Jia | G06T 7/30 |
| 2008/0181487 A1* | 7/2008 | Hsu | G06T 5/20 356/3 |
| 2010/0166294 A1* | 7/2010 | Marrion | G06V 20/653 382/154 |

OTHER PUBLICATIONS

Gao et al, Accurate and Efficient Ground-to-Aerial Model Alignment, Pattern Recognition, vol. 76, Apr. 2018, pp. 288-302 (Year: 2018).*
Aiger et al., 4-points congruent sets for robust pairwise surface registration, ACM transactions on graphics, ACM, NH, US vol. 27(3), XPO5 8355378, ISSN: 0730-0301, DOI: 10.1145/1360612.1360684, pp. 1-10, Aug. 1, 2008.
Invitation to pay additional fees, PCT/US2021/070718, Oct. 4, 2021.

(Continued)

*Primary Examiner* — Matthew Salvucci
(74) *Attorney, Agent, or Firm* — William A. Bonk, III

(57) ABSTRACT

System and method for registering aerial and ground data including locating rigid features such as walls in both aerial and ground data, registering the ground rigid data to the aerial rigid data, and transforming the ground data using the transform from the registration, including breaking the data into sectors and aligning the sectors. Deformities in the ground data are accommodated.

36 Claims, 14 Drawing Sheets

(56) References Cited

OTHER PUBLICATIONS

Kim et al., Urban scene understanding from aerial and ground LIDAR data, Machine Vision and Applications, Springer, Berlin, DE, vol. 22(4), XPO19916772, ISSN: 1432-1769, DOI: 10.1007/S00138-010-0279-7, pp. 691-703, Jul. 16, 2010.
Petricek et al., Point cloud registration from local feature correspondences—Evaluation on challenging datasets, PLoS ONE 12(11):e0187943 https:doi.org/10/1371/journal.pone.0187943, May 26, 2020.
Surmann et al., 3D mapping for multi hybrid robot cooperation, arXiv.org, Cornell University Library, 201 Olid Library Cornel Universion, Ithaca, NY 14853, DOI: 10.1109/IROS.2017.8202217, Apr. 8, 2019.
Xiang et al., Ground and aerial meta-data integration for localization and reconstruction: A review, Pattern Recognition Letters, Elsevier, Amsterdam, NL, vol. 127, XP085883388, ISSN: 0167-8655, DOI: 10.1016/J.PATREC.2018.07.036, pp. 202-214, Aug. 1, 2018.
Surmann et al.: 3D Mapping for Multi Hybrid Robot Cooperation, published Apr. 8, 2019, Cornell University Library, 8 pages.
Xiang et al.: Ground and Aerial Meta-data Integration for Localization and Reconstruction: A Review published Aug. 1, 2018, Pattern Recognition Letters, Abstract only provided herein.
Kim et al.: Urban Scene Understanding from Aerial and Ground LIDAR Data published Jul. 16, 2010, Machine Vision and Applications, vol. 22, No. 4, pp. 691-703.
Aiger et al.: 4-Points Congruent Sets for Robust Surface Registration, published Aug. 1, 2008, ACM Transactions on Graphics, vol. 27, No. 3, pp. 1-10.
International Preliminary Report on Patentability dated Dec. 29, 2022, issued in PCT International Patent Application No. PCT/US/2021/070718, 15 pages.
International Search Report and Written Opinion dated Nov. 25, 2021, issued in PCT International Patent Application No. PCT/US/2021/070718, 21 pages.

* cited by examiner

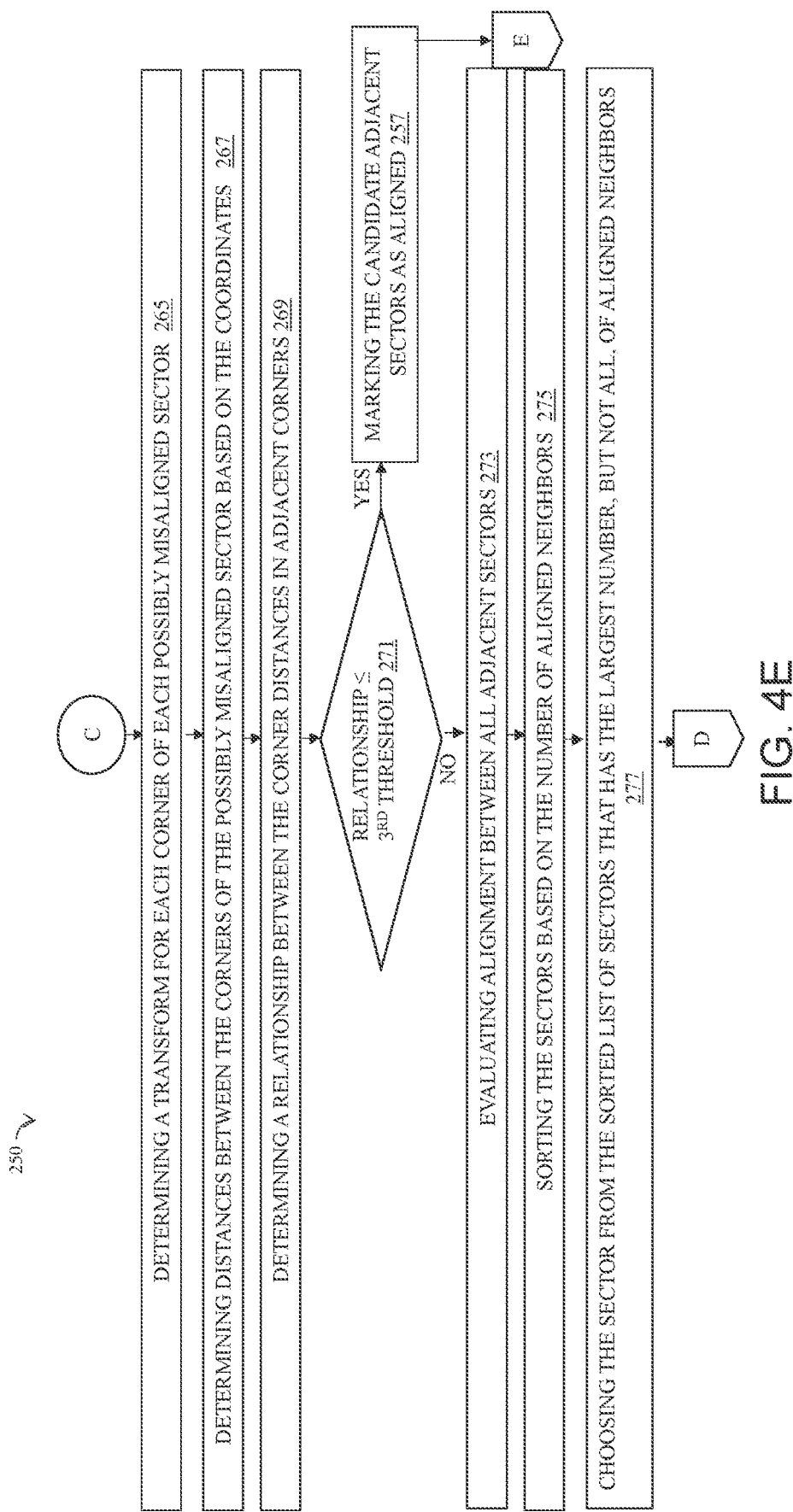

SYSTEM AND METHOD FOR AERIAL TO GROUND REGISTRATION

CROSS REFERENCE TO RELATED APPLICATIONS

This application claims the benefit of U.S. Provisional Application Ser. No. 63/040,789, filed Jun. 18, 2020, entitled SYSTEM AND METHOD FOR AERIAL TO GROUND REGISTRATION, which is incorporated herein by reference in its entirety.

BACKGROUND

A point cloud is a set of points in 3-D space that can be gathered from sensors such as LIDAR sensors. Point cloud registration is the process of aligning two or more 3-D point clouds of the same scene, thus enabling combing data from different sources to create a richer dataset than if a single sensor is used. A 3-D scene can be created during the registration process. A typical registration process involves filtering the sensor data, determining the location of the points in the datasets, and aligning/stitching data from various parts of the datasets together. Common registration types include rigid, affine, and non-rigid. The type of registration chosen determines which transformation is applied to the points in the point cloud. For example, a rigid registration applies the same transformation to all points in the point cloud, whereas a non-rigid registration applies a transformation to a point based on a displacement field. Common rigid registration methods include normal-distributions transform (NDT) and iterative closets point (ICP), while common all-purpose registration methods include coherent point drift (CPD).

To register ground data with aerial data, there can be many obstacles. Camera viewpoints and imaging conditions can be different. Aerial images are typically captured from greater distances and different angles than ground images. The direction of sunlight can affect the appearance of landmarks in aerial images, making feature matching challenging. Automated matching and reconstruction of aerial and ground imagery without any manual intervention can be further challenging. Some success has been achieved when matching cropped aerial photos with synthesized views from a ground image. Geo-registration of ground-level models can be achieved using image data. GPS and text labels can be used to approximately estimate a location. Edges of aerial image edges can be mapped to 2D projections of ground information, but there are issues in obtaining the number of edges required in ground information to map the edges. Some studies have geo-located ground images with street view images. Each of these processes has issues with location error. Feature matching at a highly precise level, taking into account a multitude of geographic and temporal variations, can be very time-consuming and inappropriate for fast decision-making by an autonomous vehicle.

SUMMARY

The system and method of the present teachings can be used to combine aerial and ground data to create a dataset suitable for an autonomously driven vehicle. The aerial data can be considered more reliable than the ground data for reasons that can include, but are not limited to including, the possibility that the GPS providing location data to the ground data sensor could be occluded. Therefore, the location of aerial data features can be used to correct the ground data by locating the same features in both the aerial and ground data. Thus, the input to the process of the present teachings is two point clouds, one an aerial point cloud and one a ground point cloud, and the output from the process of the present teachings is a uniform dataset of aerial and ground data.

The aerial-ground method of the present teachings can include, but is not limited to including, collecting ground point cloud data and aerial point cloud data for the same geographic region. The ground point cloud data can be more point dense than the aerial point cloud data, but it can be optimal to have the aerial and ground datasets to be consistent in point density. A filter such as, for example, but not limited to, a conventional voxel grid filter, can be applied to both datasets to achieve consistent point density. Regardless of the choice of filter, the point cloud supplied to the filter can be divided into sectors. If the sector does not include at least a pre-selected threshold number of points, the sector can be discarded. The pre-selected threshold can be filter-dependent and/or application-dependent. The conventional voxel grid filter can provide a point cloud having a smaller number of points than the original point cloud, the smaller number of points representing the point cloud as a whole. A voxel is a unit of graphic information that defines a point in 3D space, and represents a single sample on a regularly spaced 3D grid. The voxel can include a single piece of data or multiple pieces of data such as color and opacity. The voxel grid filter can spatially average the points in the point cloud by dividing the point cloud into a regular grid of voxels, and combining the points within the voxel into one output point. Combining the points can be done by, for example, locating the centroid or spatial average of the voxel, or the geometric center of the voxel, among other methods. Selecting a method of combining can be based on, for example, the relative importance of accuracy versus computational intensity.

The aerial-ground method can include locating surfaces in the ground PC data. In some configurations, surface points can be determined based on eliminating the elevated features in the point cloud, thus leaving behind the surface points. In some configurations, a conventional progressive morphological filter can be used to determine the surface points.

Point cloud data can include deformities such as, for example, twists, that can cause registration to fail. To address this issue, surface data can be broken into sectors that are small enough so that deformities such as twists can be linearly approximated, but large enough to keep at a minimum the number of intersection points between sectors that need to be smoothed. If the sectors are too small, each sector may include no surface points at all. Sectors can include sizes in the range of 75 m×75 m to 125 m×125 m. After the sectors are determined, they can be aligned. In some configurations, a conventional normal distributions transforms (NDT) process can be used to achieve sector alignment. Zaganidis et al., Semantic-assisted 3D Normal Distributions Transform for scan registration in environments with limited structure, Proceedings of the IEEE International Conference on Intelligent Robots and Systems (IROS), pp. 4064-4069, September 2017), which is incorporated herein by reference in its entirety. Other alignment processes can also be used, especially if point cloud data are sparsely situated. If NDT is used, the first step in alignment is to compute the NDT for each of the sectors. NDT can transform the surface data into a set of normal distributions representing the local structure of points, and can register the distributions instead of matching individual scan points across the sectors. To determine the distance between the sectors, the minimum distance to/from each point in a first sector to/from a point in the a neighboring sector is computed. If the minimum distance is lower than a pre-selected threshold, then the average distance across all the measurements is determined. When the average distance is less than a pre-selected threshold in the range of about 0.5-1.5 m, for example, 0.85 m, the sectors are considered aligned. When the average distance is greater than or equal to the pre-selected threshold, each sector has universal transverse mercator (UTM) coordinates assigned to it, and NDT transforms are computed for all corners of the sector data. Some sectors may be aligned with each other. To determine which sectors are still not aligned with their neighbors, the distance between the sector edges and its neighbors' edges can be determined. If the distance exceeds a pre-selected threshold, the sectors are not aligned. The pre-selected threshold can include a range from 0.5 m-1.5 m, for example, 0.85 m. The sectors can be sorted by the number of neighbors they are aligned with. The sectors with the largest number of aligned neighbors can be completely aligned with their remaining unaligned neighbor(s) first by using the NDT transform associated with the almost-aligned sector on the unaligned neighbor. If more than one NDT transform can be used, an average of the NDT transforms is taken and used. The sort and alignment can be re-executed until there are no sectors remaining to be aligned. This process can result in an aligned sectors including filtered surface data from which wall features may be extracted.

To extract wall features, the surface points within the aligned sectors can be subjected to a feature determination process such as, for example, but not limited to, a conventional convex hull process. The convex hull process can begin by selecting the point in the dataset with the smallest angle from a vertical axis that extends through a selected origination point. A line is drawn between the origination point and the selected point. The next point in the dataset with the next smallest angle from the line between the origination point and the selected point is chosen, and a line is drawn connecting the selected point and the next point. This process is followed until a desired number of polygons is formed. Extracting wall features from the polygons can include comparing the angle the potential wall makes with a horizontal axis. Polygons that are leaning too heavily towards the ground are not included in the set of polygons that represents walls.

The filtered aerial point cloud data can include convex shapes that can represent roof and surface features. The roof and surface features can be determined by, for example, but not limited to, a conventional convex hull algorithm. The edges of roof and surface features can be connected to infer wall features. Registration between the walls found in the ground data and the walls found in the aerial data can yield a transform that can be applied to the ground point cloud data, thus forming a uniform aerial/ground point cloud dataset.

A method for registration of 3D ground point cloud (PC) data to 3D aerial PC data can include, but is not limited to including, locating surfaces in the 3D ground PC data, dividing the 3D ground PC data with located surfaces into members of a sector set, aligning the members with each other, locating like features in the 3D aerial PC data and the aligned members of the sector set, registering the like features in the 3D ground PC data with the 3D aerial PC data, and creating a transform based on the registration. Aligning the sectors can optionally include determining coordinates and coordinate transforms for each corner of each of the members of the sector set, and determining, based on the coordinates, a first member of the members. The first member can be adjacent to and not aligned with a second member of the members. Aligning the sectors can include applying the coordinate transforms associated with the first member to the coordinates of the second member. The method can optionally include applying a combination of multiple of the coordinate transforms to the second member based at least on a third member of the members. The method can optionally include filtering the 3D aerial PC data and the 3D ground PC data. The method can optionally include filtering the 3D aerial PC data and the 3D ground PC data using a voxel filter.

Aligning of the sectors can optionally include determining if the members are adjacent based on at least on a distance between selected data points between the members, determining if the members are aligned based at least on coordinates of each of the corners of each of the members, determining a coordinate transform for each of the corners of each of the members, and applying the coordinate transforms associated with a first member of the members to a second member of the members based at least on whether the first member and the second member are adjacent and misaligned. Determining if the members are aligned can optionally include determining distances between the corners of the members based on the coordinates, determining a relationship between the corner distances in adjacent corners of the members. The relationship can be associated with a line connecting the corners. If the relationship yields a value that is less than or equal to a third threshold, the method can optionally include marking the members as aligned. If the relationship yields the value that is greater than the third threshold, the method can optionally include evaluating alignment between all adjacent members, and sorting the members based on a number of aligned of the members that are also adjacent to the members. The method can optionally include averaging the coordinate transforms of a first corner of a fourth member not aligned with and adjacent to a fifth member, the fifth member being not aligned, with the coordinate transform of a second corner of the fifth member, if the second corner of the fifth member would be used for alignment with third corner that is being aligned with the first member, and applying the averaged transform to the fourth member. Each of the members can optionally include a substantially 50-150 $m^2$ range.

A method for locating walls in aerial point cloud (PC) data and ground PC data can include, but is not limited to including, filtering the aerial PC data the ground PC data, creating sectors of a pre-selected size within the filtered aerial PC data and the ground PC data, aligning the sectors in the ground PC data, identifying possible walls in the aligned sectors, identifying possible roofs and possible surfaces in the aerial PC data, forming polygons around the possible walls, the possible roofs, and the possible surfaces, and forming walls from the possible roofs and the possible surfaces. The method can optionally include downsampling the ground PC data. The method can optionally include applying a voxel filter to the ground PC data.

A system for point cloud (PC) registration of ground PC data to aerial PC data can include, but is not limited to including, a surface grid processor creating a surface grid from the ground PC data, including surfaces located in the ground PC data, a sector processor breaking the surface grid into sectors, the sector processor aligning the sectors, a ground rigid feature processor locating ground rigid features within the aligned sectors, an aerial rigid features processor locating aerial rigid features within the aerial PC data, a registration process determining a transform by registering the ground rigid features to the aerial rigid features, and a transformation process transforming the ground PC data according to the transform. The ground rigid features can optionally include walls. The aerial rigid features can optionally include roofs and rigid surfaces. The system can optionally include a filter filtering the aerial PC data and the ground PC data. The system can optionally include a voxel filter filtering the aerial PC data and the ground PC data.

The sector processor can optionally include computer code executing instructions for (a) if there are more of the sectors to align, (b) choosing candidate adjacent sectors, (c) determining a minimum distance between points in the candidate adjacent sectors, (d) if the minimum distance is less than or equal to a first threshold, marking the candidate adjacent sectors as aligned and returning to (b), (e) if the minimum distance is greater than the first threshold, taking an average distance between all points in the candidate adjacent sectors, (f) if the average distance is less than or equal to a second threshold, marking the candidate adjacent sectors as aligned and returning to (b), (g) if the average distance is greater than the second threshold, (1) determining coordinates for each corner of each possibly misaligned sector, and (2) determining a transform for each of the corners of each of the possibly misaligned sectors, (h) determining distances between the corners of the possibly misaligned sector based on the coordinates, (i) determining a relationship between the corner distances in adjacent corners, the relationship being associated with a line connecting the corners. The instructions can include (j) if the average is less than or equal to a third threshold, marking the candidate adjacent sectors as aligned and returning to (b), (k) if the average is greater than the third threshold, evaluating alignment between all adjacent sectors, (1) sorting the sectors based on a number of aligned neighbors forming a sorted list of sectors, (m) choosing the sector from the sorted list of sectors that has the largest number, but not all, of aligned neighbors, (n) applying the transform from the chosen sector to a non-aligned neighbor at adjacent of the corners, (o) if the non-aligned sector has another non-aligned neighbor, and if a corner of the non-aligned neighbor would be used for alignment with a same corner that is being aligned with the chosen sector, (1) averaging the transforms of the same corner, and (2) applying the averaged transform to the non-aligned sector, (p) if the non-aligned sector does not have another non-aligned neighbor, and if there are more sectors to align, returning to (b), and (q) if one of the corners of the non-aligned neighbor would not be used for alignment with a same of the corners that is being aligned with the chosen sector, continuing at (o). The relationship can optionally include an average. The sector processor can optionally include identifying, as the relationship, a value representative of a distance between the two of the possibly misaligned sectors. The sectors can optionally include a substantially 50-150 m2 range.

A system for locating walls in aerial point cloud (PC) data and ground PC data can include, but is not limited to including, a filter processor filtering the aerial PC data the ground PC data, a sector processor creating sectors of a pre-selected size within the filtered aerial PC data and the ground PC data, the sector processor aligning the sectors in the ground PC data, a ground wall processor identifying possible walls in the ground PC data, an aerial wall processor identifying possible roofs and possible surfaces in the aerial PC data, a polygon processor forming polygons around the possible walls, the possible roofs, and the possible surfaces, and a wall processor forming walls from the roofs and surfaces. The filter processor can optionally include downsampling the ground PC data. The filter processor can optionally include a voxel filter filtering the ground PC data.

A method for registration of 3D ground point cloud (PC) data to 3D aerial PC data can include, but is not limited to including, creating a surface grid from the ground 3D PC data, including surfaces located in the ground 3D PC data, breaking the surface grid into sectors, aligning the sectors, locating features within the aligned sectors, locating the features within the 3D aerial PC data, and determining a transform by registering the features within the aligned sectors to the features within the aerial PC data.

BRIEF DESCRIPTION OF THE DRAWINGS

The present teachings will be more readily understood by reference to the following description, taken with the accompanying drawings, in which:

FIGS. 4D-4F are flowcharts of the method depicted in FIGS. 4A-4C;

DETAILED DESCRIPTION

The system and method of the present teachings can enable the use of aerial sensor data to augment ground sensor data when compiling a scene that can be used for autonomous vehicle navigation.

Figure 1:
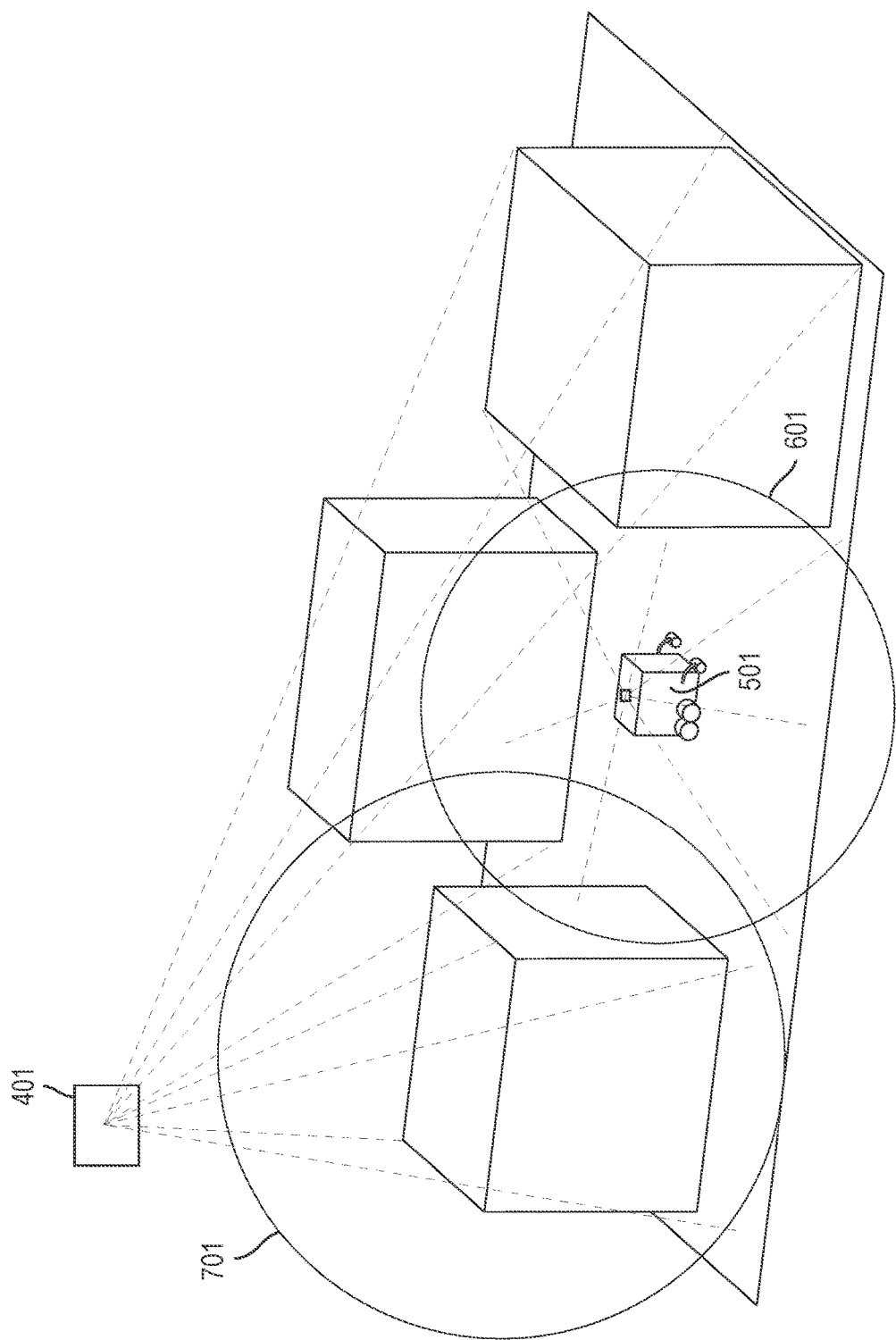
FIG. 1 is a pictorial representation of the data collection of the present teachings.

Referring now to FIG. 1, terrain data for a geographic area can be gathered from aerial sensors 401 and ground-based sensors 501, and can be combined to form a richer dataset than either aerial or ground-based sensors could form separately. Aerial sensor data can include, but is not limited to including, aerial point cloud data 701. Ground-based data can include, but is not limited to including, ground-based point cloud data 601. Aerial data 701 can be collected by airborne devices that can include, but are not limited to including, unmanned aerial vehicles such as drones and all types of piloted aircraft, for example. The airborne device can include aerial sensor 401 that can include, but is not limited to including, LIDAR technology. A LIDAR system can include the sensor itself as well as a high-precision satellite positioning system and high-accuracy sensors such as inertial measurement units to determine the orientation of the sensor in space. These systems work together to enable processing of the raw aerial sensor data. Ground-based equipment 501 can collect ground-based data 601. Ground-based equipment 501 can be mounted upon any ground-based structure such as a building, a vehicle, or a tree.

Ground-based equipment 501 can include a LIDAR system as discussed with respect to aerial equipment. The positioning system associated with ground-based equipment 501 can be subject to occlusion, which can affect the quality of ground-based data 601.

Continuing to refer to FIG. 1, with respect to combining aerial data 601 with ground data 701, and taking into consideration that ground-based data 601 could have location issues, the locations of the points in the datasets must be rectified relative to each other. Ground truth location of immobile objects can be used transform the entire ground-based point cloud to repair any issues with location of the points. Immobile objects that both ground-based and aerial sensors can locate can include, but are not limited to including, walls. Immobile objects can include buildings, and buildings can include walls. Any immobile objects can be used as ground truth. The process of the present teachings can be broadened to include using any sort of immobile object as ground truth. The example provided herein, in which buildings and walls are used for ground truth, is provided for illustrative purposes only. Aerial data 701 can include, for example, roof-like structures 102 and surface data 104. Ground data 601 can include, for example, wall-like structures 106 and surface data 108. Roof-like structures 102 and surface data 104 can be connected to extract wall data from aerial data 701. Wall-like structures that occur in both datasets can be used to register aerial and ground data.

Figure 1A:
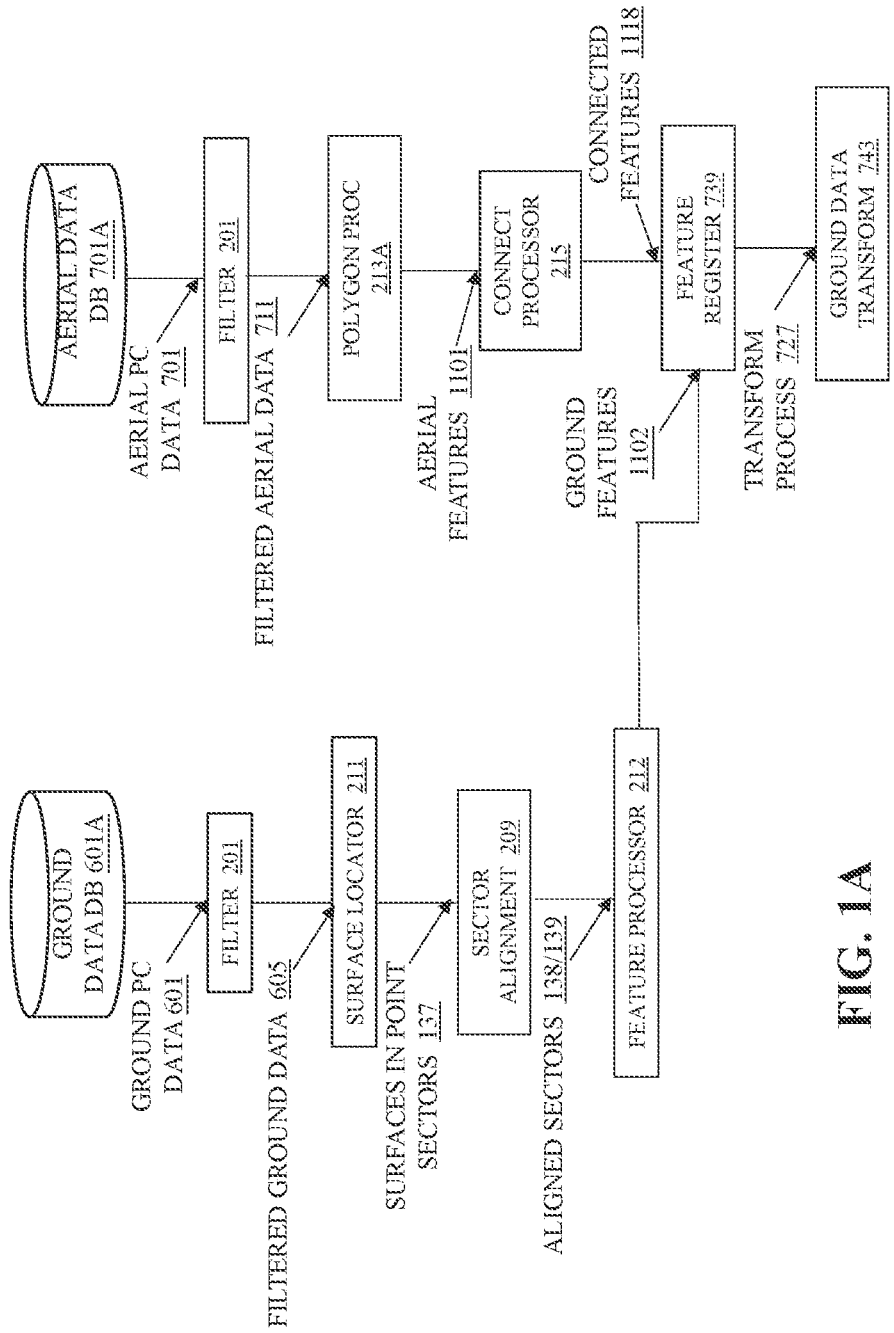
FIG. 1A is a flowchart of the process of the present teachings for using the data from FIG. 1.

Referring now to FIG. 1A, the process of the present teachings for combining aerial point cloud data 701 from aerial data database 701A, and ground-based point cloud data 601 from ground data database 601A, can include filtering aerial point cloud data 701 and the ground-based point cloud data 601 to create datasets that can be efficiently manipulated and combined. Ground data database 601A and aerial data database 701A can represent any data source, for example, data received directly from sensors, or data stored in a repository for later processing, or a combination. Ground-based data can be smoothed to account for deformities in the data such as twists. Perimeters of possible surfaces of interest can be found from the datasets, and the surfaces can be subjected to filtering criteria to identify desired features. Transforms used to register the features discovered in the ground data with the same features discovered in the aerial data can be used to register ground-based dataset 601 to aerial dataset 701, thus forming a consistently-georeferenced combined dataset.

Continuing to refer to FIG. 1A, filtering the point cloud data can include, but is not limited to including, filter 201 that can be used, for example, to reduce the number of points under consideration. The type of filter selected can be governed by the size of the dataset and the particular features that will be considered of interest, for example. In an aspect, a conventional voxel filter as described herein can be used to filter the data, producing filtered aerial data 711 and filtered ground-based data 605. Surface locator 211 can locate surfaces 137 in filtered ground-based data 605. Sector alignment 209 can divide ground PC data 601 having located surfaces 137 into sectors 137. Sector alignment 209 can aligned the sectors with each other, forming aligned sectors 138/139. Polygon processor 213A can locate aerial features 1101 from filtered aerial data 711. The perimeters of features in both aligned sectors 138/139 and aerial features 1101 can be established by, for example, but not limited to, a conventional convex hull process executed in, for example, feature processor 212 and connect processor 215. Connect processor 215 can connect features in aerial PC data 701 that can be connected to each other and form connected features 1118. For example, roofs of buildings and nearby surfaces that are visible in aerial PC data 701 can be connected to each other to form further features such as the walls of the buildings. Ground features 1102 and connected features 1118 can be used by feature register 739 to register the features in the ground PC data with the like features in the aerial PC data. For example, if connected features 1118 are walls, similarly-situated walls can be located in ground PC data 601. Transform process 727 can determine transforms from the registration process, and ground data transform 743 can apply the transforms to ground data.

Figure 2:
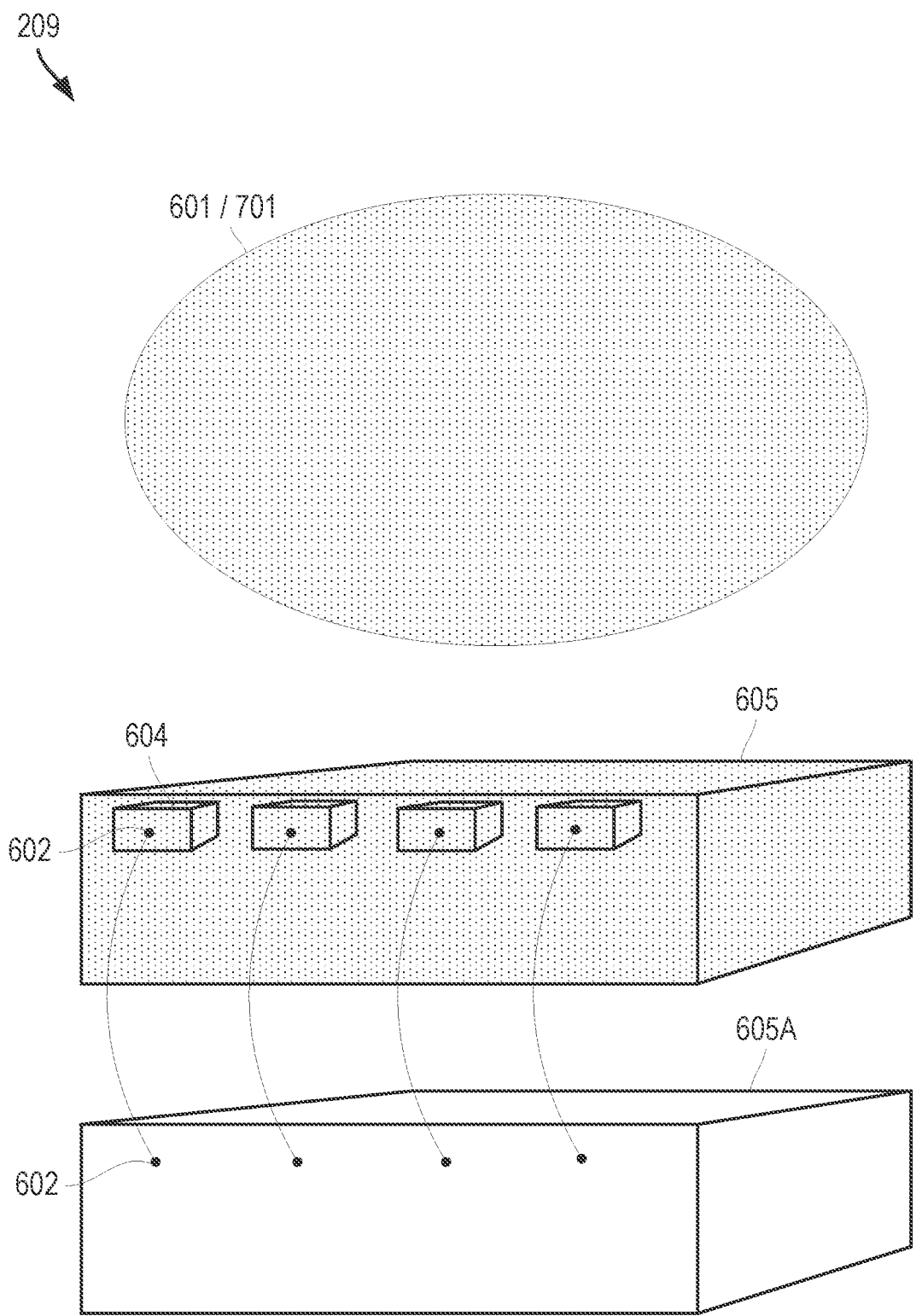
FIG. 2 is a pictorial representation of the filtering of the present teachings.

Referring now to FIG. 2, with respect to filtering, given point cloud 601, in an aspect, a conventional voxel filter can return point cloud 605A with a smaller number of points than were in original point cloud 601. Filtered point cloud 605A can represent original point cloud 601 as a whole. The voxel filter can downsample data from gridded point cloud 605 by choosing point 602 in each "cell" (voxel) 604 in gridded point cloud 605 to represent the rest of the points in cell 604. The set of points that lie within the bounds of voxel 604 can be combined into representative point 602. The method for representing points in voxel 604 by a single point can take any number of forms. For example, a centroid or spatial average of the point distribution can be computed, or the point at the geometrical center of voxel 604 can be selected to represent the points in voxel 604. A specific method can be chosen based on, for example, whether accuracy or computation speed is deemed more important for a particular application. In using the voxel filter, the dataset can be broken into cells of a pre-selected size, for example, but not limited to, 0.25 m. Any downsampling filter can be used, if reducing the number of points in the dataset is desired.

Figure 3:
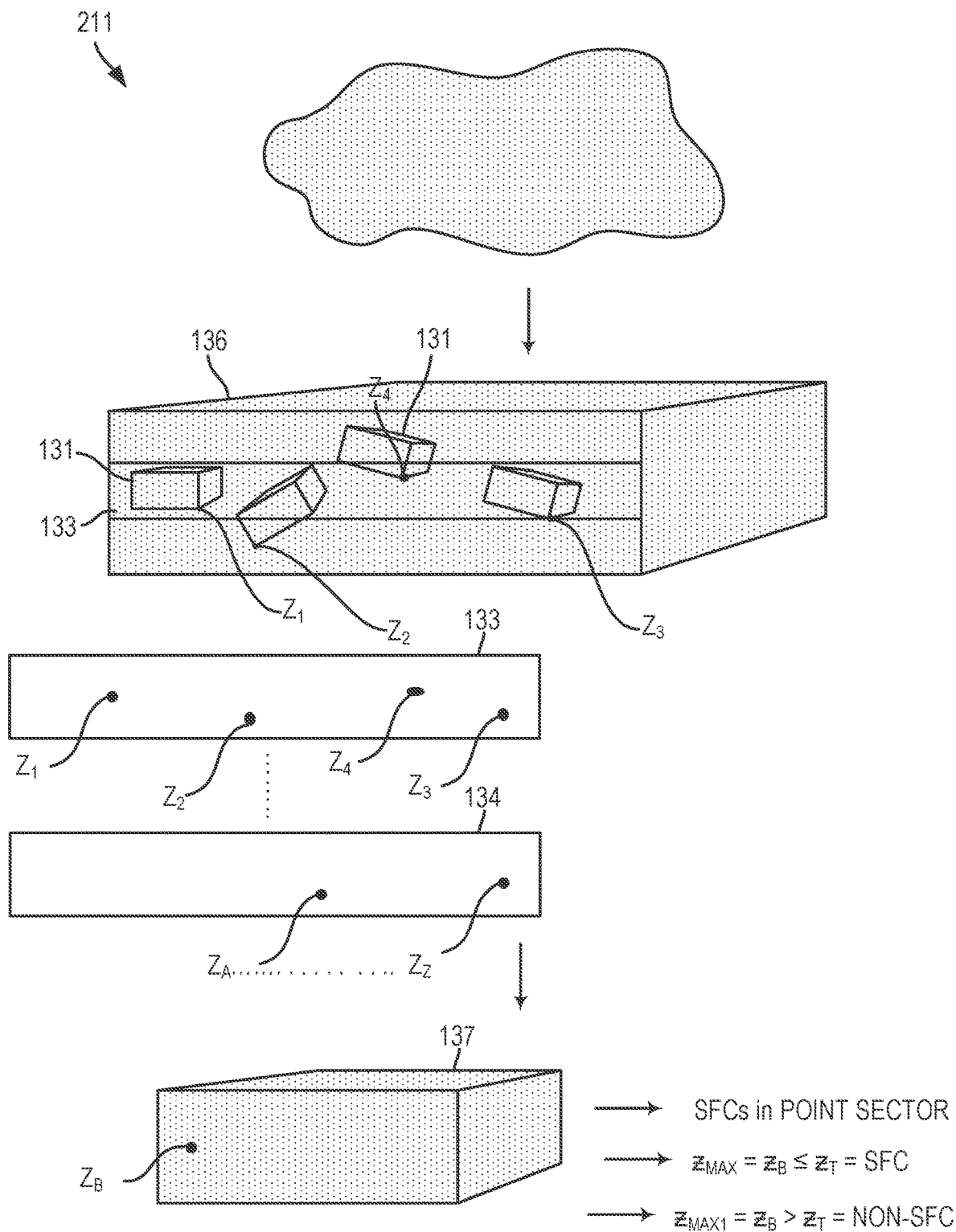
FIG. 3 is a pictorial representation of the surface locator process of the present teachings.

Referring now to FIG. 3, surface locator 211 can locate surfaces in filtered ground data 605. In an aspect, a progressive morphological filter can include the process of sorting non-surface points from surface points. The process can begin by forming regularly spaced grid 136 from the point cloud data, and locating cells 131 within the grid. Within each of cells 131, a point having a minimum elevation is chosen. Sliding filter window 133 can be used to gather subsets of the minimum elevation points identified as minimum point arrays 134. Another sliding filter window can be applied to minimum point arrays 134 to create an array 137 of points having maximum elevations within minimum point arrays 134. The elevations of the points in the maximum elevation arrays 137 can be compared to a threshold, and the points can be identified as surface or non-surface points based on their relationships to the threshold. The progressive morphological filter gradually increases the window size of the sliding filter windows and, using various pre-selected elevation difference thresholds, the buildings, vehicles, and vegetation can be removed from the dataset, while surface data are preserved. See Zhang et al., *A Progressive Morphological Filter for Removing Nonground Measurements from Airborne LIDAR Data*, IEEE Transactions on Geoscience and Remote Sensing, 41:4, April, 2003), which is incorporated herein by reference in its entirety.

Figure 4A:
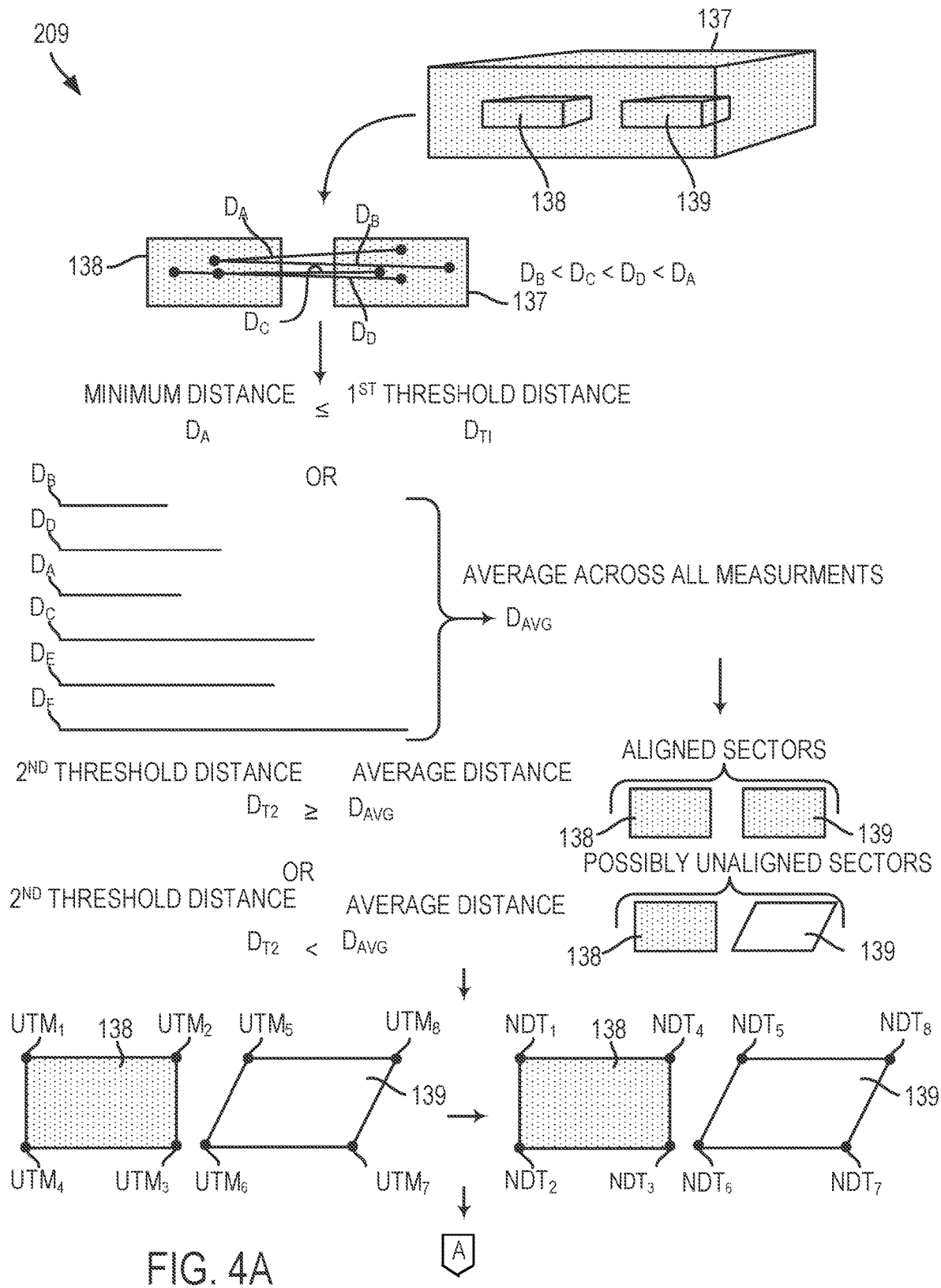
FIGS. 4A-4C are pictorial representations of the sector alignment process of the present teachings.

Referring now to FIG. 4A, surface data, isolated according to the processes described herein or any similar process, can be broken into sectors of pre-selected sizes that can then be aligned. Sector alignment 209 can be used to address deformities in the dataset such as, for example, but not limited to, twists. Sector alignment 209 can therefore perform what amounts to an approximation of the twists in the data. In an aspect, the approximation can be linear, nonlinear, or a combination. Surfaces in point sector 137 can be broken into sectors of a size amenable to being subjected to the alignment process, as discussed herein. In some configurations, the size of the sectors can be selected based upon characteristics such as point density of the dataset. In an aspect, the size of the sectors can include, but is not limited to including, 100 m×100 m.

Continuing to refer to FIG. 4A, coordinates (such as, for example, but not limited to, universal transverse mercator (UTM)) can be computed for each corner of each sector 138/139, and coordinate transform (such as, for example, but not limited to, normal distributions transform (NDT)) values can be computed for each corner as well. Sectors can be aligned by applying the coordinate transform computed for the corners of a first sector to a second sector that is not aligned with the first sector. If a corner of the second sector that is not aligned with the first sector is also not aligned with a third sector at one of the transformed points, a new transform is computed for that corner that is a function of the coordinate transform of adjacent point of the third sector and the first sector. In an example, to determine which sectors are adjacent and aligned, sectors can evaluated based on the distance between any two points $D_A$-$D_D$ in adjacent sectors 138/139. For example, if the shortest distance between any two points in adjacent sectors 138/139 is below first pre-selected threshold $D_{T1}$, sectors 138/139 are considered to be aligned. In some configurations, pre-selected threshold $D_{T1}$ can include, but is not limited to including, 0.85 m. If shortest distance $D_A$ is greater than $D_{T1}$, average $D_{AVG}$ of all point distances $D_A$-$D_D$ can be taken. If $D_{AVG}$ is less than second pre-selected threshold $D_{T2}$, sectors 138/139 can be considered aligned. On the other hand, if $D_{AVG}$ is greater than or equal to second pre-selected threshold $D_{T2}$, sectors 138/139 can be considered not aligned. Note that any coordinate system and any coordinate transform can be used to align the sectors.

Figure 4B:
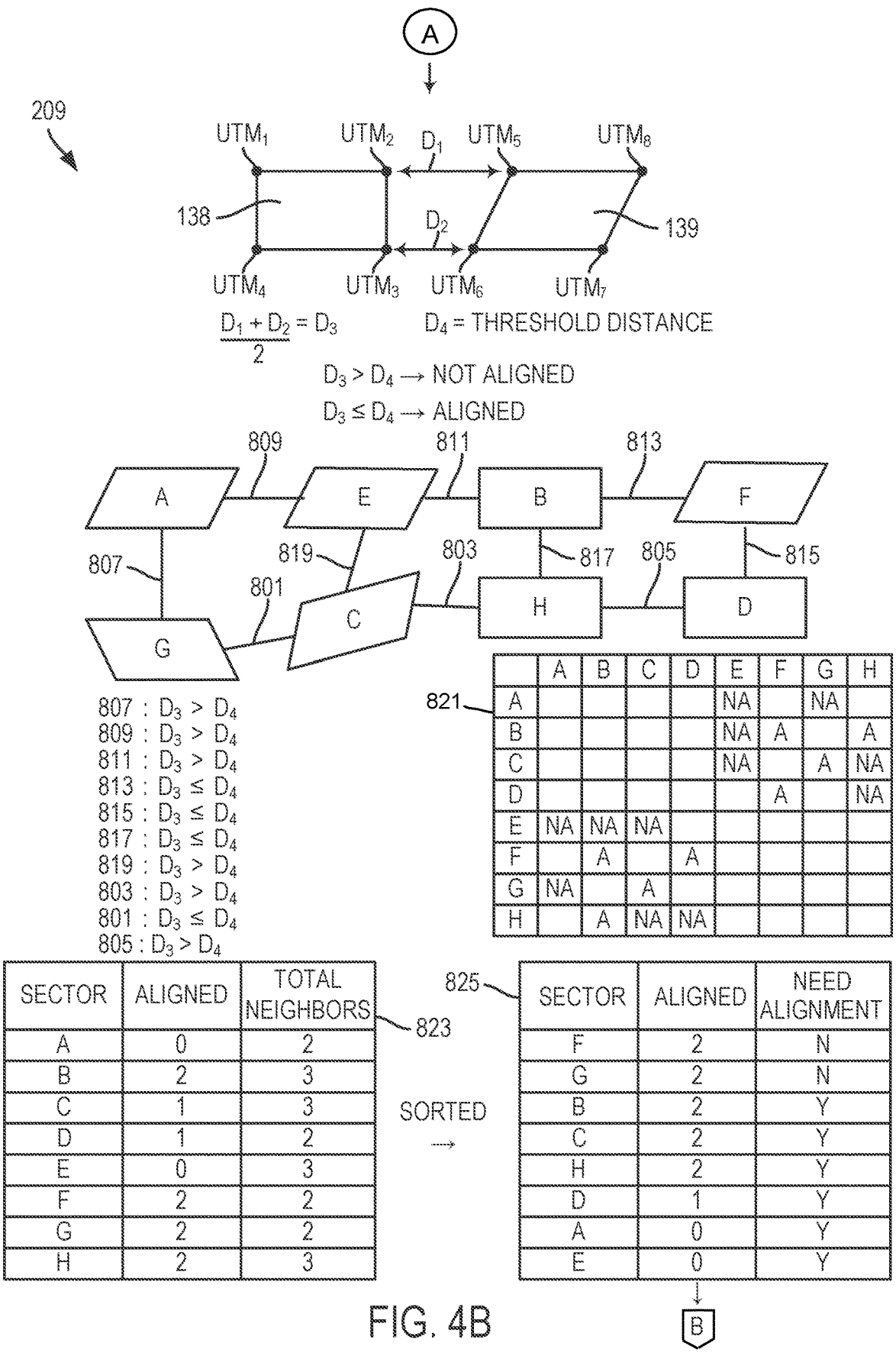

Referring now to FIG. 4B, continuing with the example, distances D1/D2 can be computed between the corners of sectors 138/139 (FIG. 4A), and a relationship between distances D1/D2 can be computed. For example, average D3 of distances D1/D2 can be taken. Other relationships are possible. If third pre-selected threshold D4 is greater than or equal to average D3, sectors 138/139 (FIG. 4A) can be considered aligned. If, on the other hand, third pre-selected threshold D4 is less than average D3, sectors 138/139 (FIG. 4A) are considered not aligned. An example of eight sectors A-H in various states of alignment is shown. Average distances 801-819 between sectors A-H are evaluated with respect to third pre-selected threshold D4. Table 821 presents sector status with respect to neighborhood alignment. The contents of table 821 are tabulated in table 823 in which sectors A-H are shown alongside their total numbers of aligned neighbors in comparison to their total number of neighbors. Table 825 is a sorted version of table 823, sorted with sectors A-H having the least need for alignment to those having the most need for alignment. For example, sectors F and G are aligned with all their neighbors, while sectors A and E are aligned with none of their neighbors. Sectors B, H, C, D, A, and E need to be aligned with at least one neighbor. The process begins by choosing the sector needing the fewest neighbors aligned, in this case sector B.

Figure 4C:
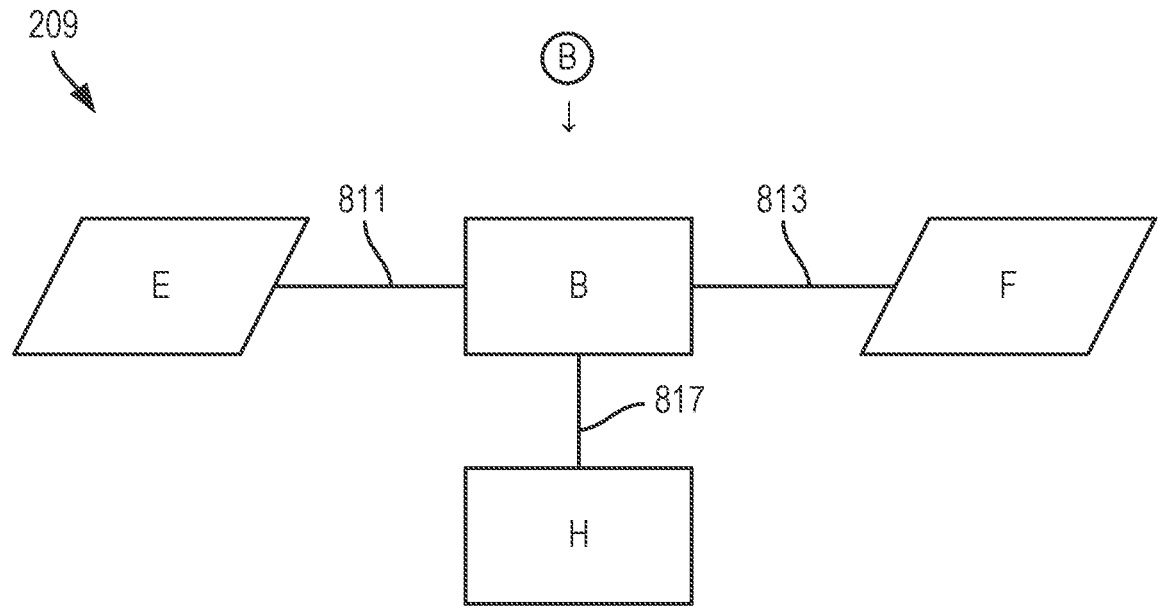
Figure 4C:
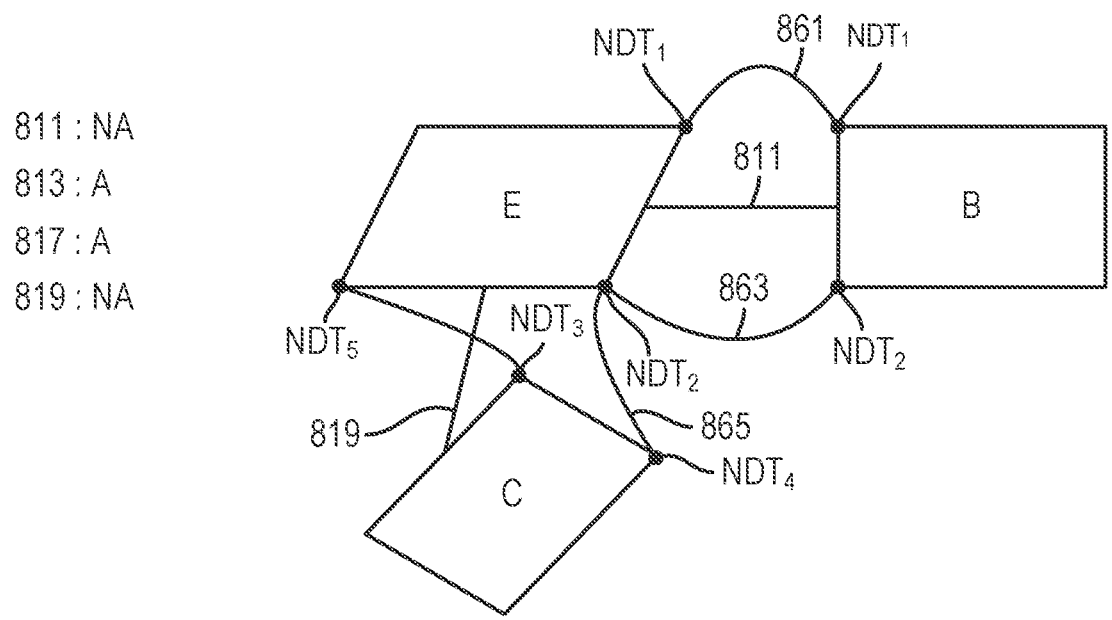

Referring now to FIG. 4C, sector B has three neighbors, sectors E, F, and H, two of which, sectors F and H, are aligned with sector B. To align sector E with sector B, transforms NDT1 and NDT2 can be applied to the corners of sector E adjacent to the corners of sector B. For example, the point in sector E at the sector E end of line 861 can be transformed using transform NDT1 associated with the point at the sector B end of line 861. If sector E had no further neighbors, the point in sector E at the sector E end of line 863 can be transformed using transform NDT2 associated with the point at the sector B end of line 863. Sector E, however, has neighbor sector C with which sector E is not aligned. Transform NDT4 is associated with the sector C point adjacent to the sector E point at the end of line 865. To complete the alignment of sector E, a relationship between NDT2 and NDT4 can be developed and applied to the sector E point at the ends of lines 863 and 865. The relationship can include, but is not limited to including, averaging NDT2 with NDT4 and applying the average transform to sector E. This process is repeated until all sectors are aligned.

Figure 4D:
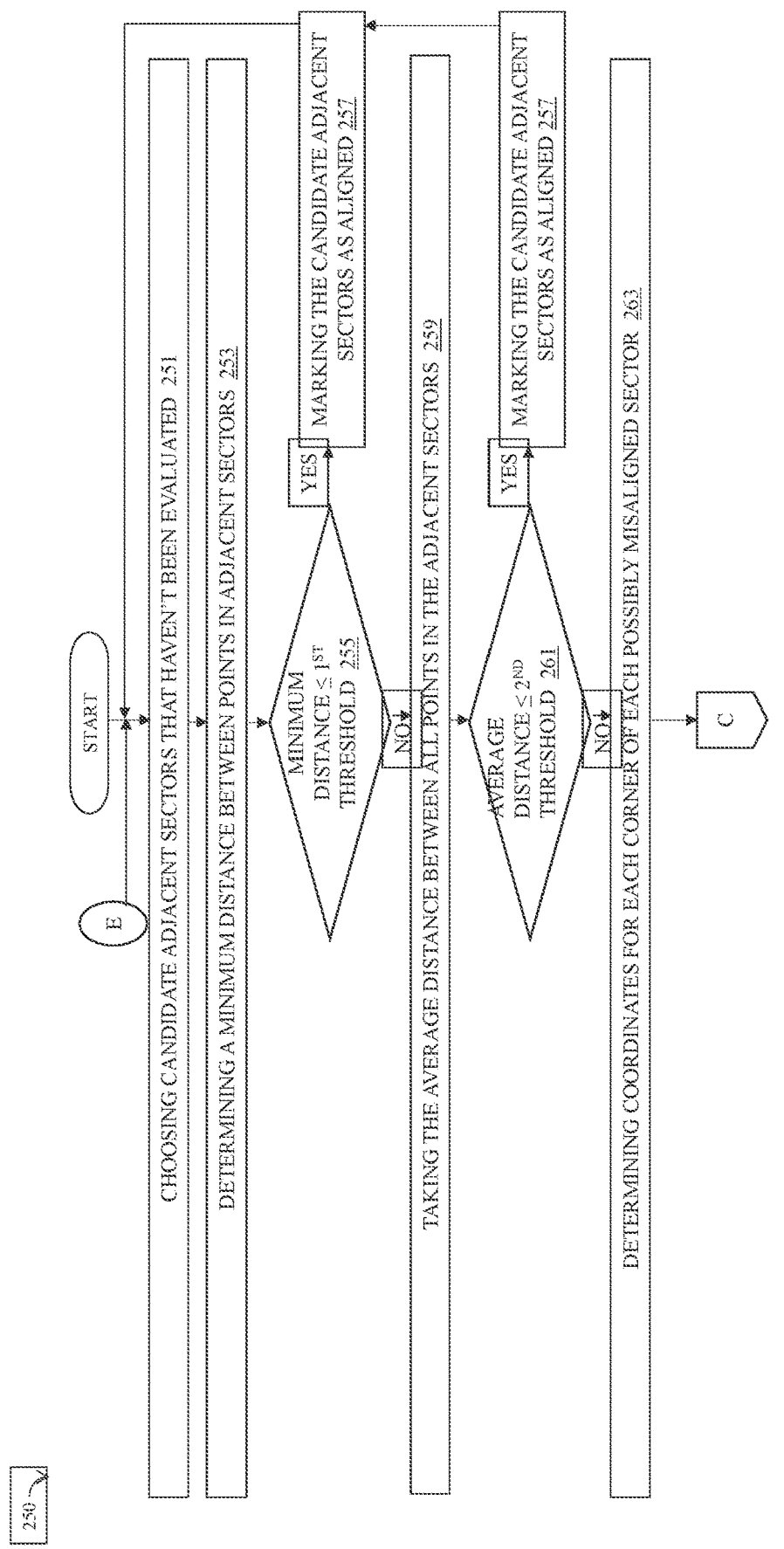

Referring now to FIG. 4D, method 250 for aligning sectors can include, but is not limited to including, choosing 251 candidate adjacent sectors, and determining 253 a minimum distance between points in adjacent sectors. If 255 the minimum distance is less than or equal to a first threshold, method 250 can include marking 257 the candidate adjacent sectors as aligned and returning to choosing 251 more candidate adjacent sectors. If 255 the minimum distance is greater than the first threshold, method 250 can include taking 259 the average distance between all points in the adjacent sectors. If 261 the average distance is less than or equal to a second threshold, method 250 can include marking 257 the candidate adjacent sectors as aligned and returning to choosing 251 more candidate adjacent sectors. If 261 the average distance is greater than the second threshold, method 250 can include determining 263 coordinates for each corner of each possibly misaligned sector.

Referring now to FIG. 4E, method 250 can include determining 265 a transform for each corner of each possibly misaligned sector. Method 250 can include determining 267 distances between the corners of the possibly misaligned sector based on the coordinates, and determining 269 a relationship between the corner distances in adjacent corners, the relationship being associated with the line connecting the corners. The relationship can include, but is not limited to including, an average, a weighted average, or any other way to identify a value representative of the distance between the two possibly misaligned sectors. If 271 the average is less than or equal to a third threshold, method 250 can include marking 257 the candidate adjacent sectors as aligned and returning to choosing 251 more candidate adjacent sectors. If 271 the average is greater than a third threshold, method 250 can include evaluating 273 alignment between all adjacent sectors, and sorting 275 the sectors based on the number of aligned neighbors. Method 250 can include choosing 277 the sector from the sorted list of sectors that has the largest number, but not all, of aligned neighbors.

Figure 4F:
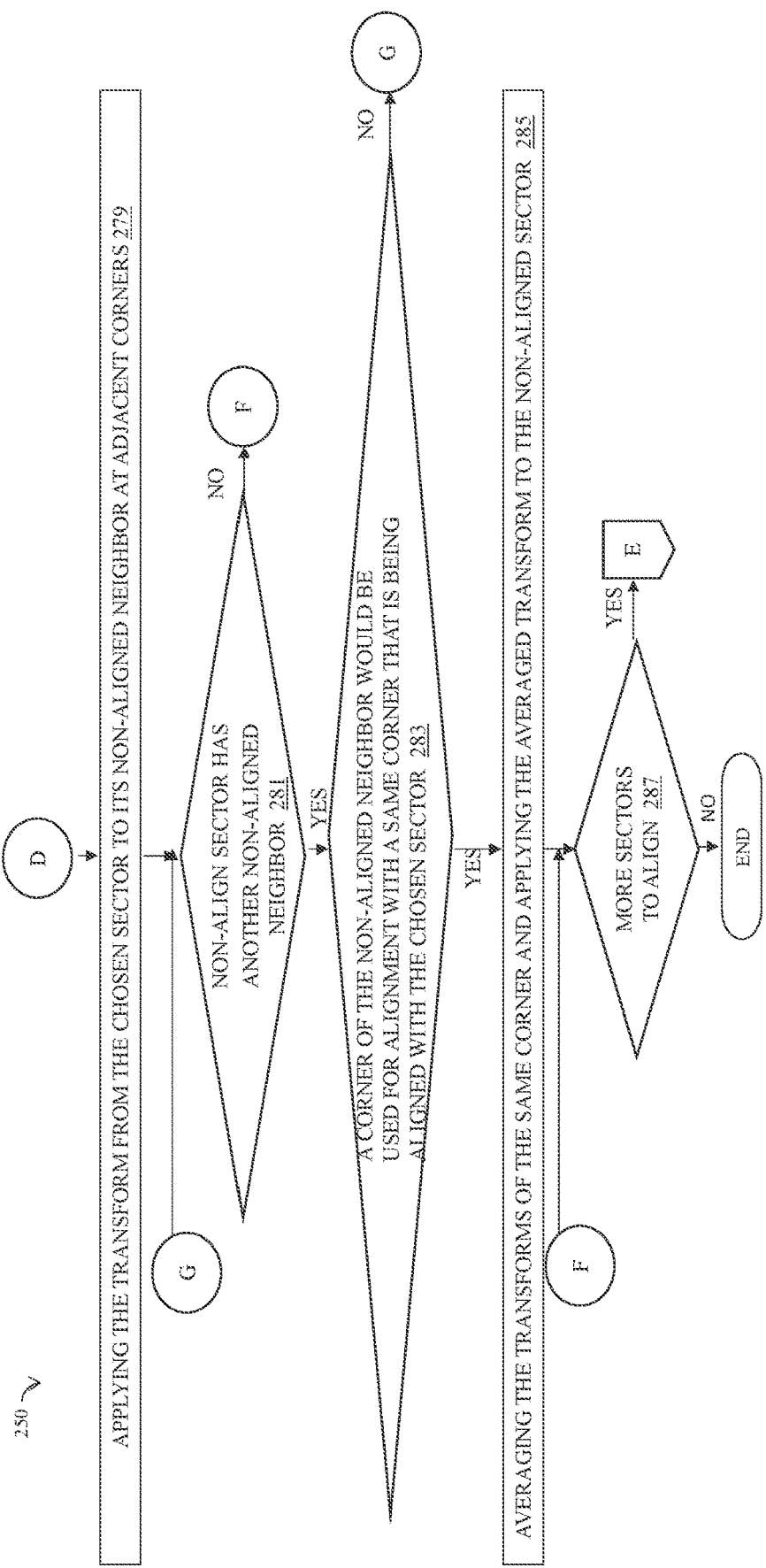

Referring now to FIG. 4F, method 250 can include applying 279 the transform from the chosen sector to its non-aligned neighbor at adjacent corners. If 281 the non-aligned sector has another non-aligned neighbor, and if 283 a corner of the non-aligned neighbor would be used for alignment with a same corner that is being aligned with the chosen sector, method 250 can include averaging 285 the transforms of the same corner and applying the averaged transform to the non-aligned sector. If 287 there are more sectors to align, method 250 can include returning to step 251. If 287 there are no more sectors to align, method 250 can include ending the process. If 281 the non-aligned sector does not have another non-aligned neighbor, and if 287 there are more sectors to align, method 250 can include returning to the beginning of method 250 by choosing 251 candidate adjacent sectors that have not been aligned. If 283 a corner of the non-aligned neighbor would not be used for alignment with a same corner that is being aligned with the chosen sector, method 250 can include continuing method 250 at step 281.

Figure 5:
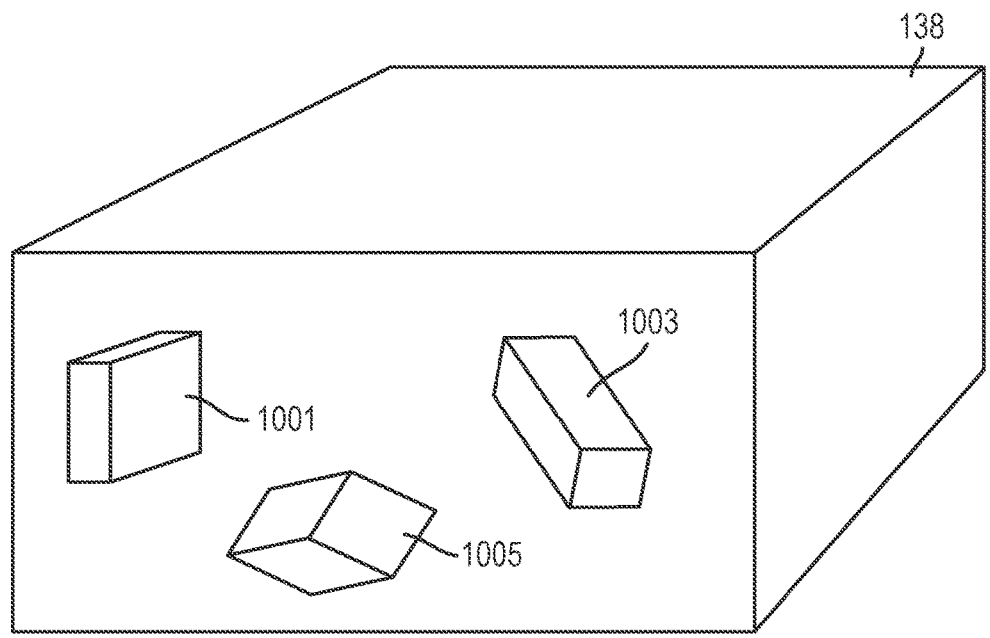
FIG. 5 is a pictorial representation of the process of extracting walls from ground PC data of the present teachings.
Figure 5:
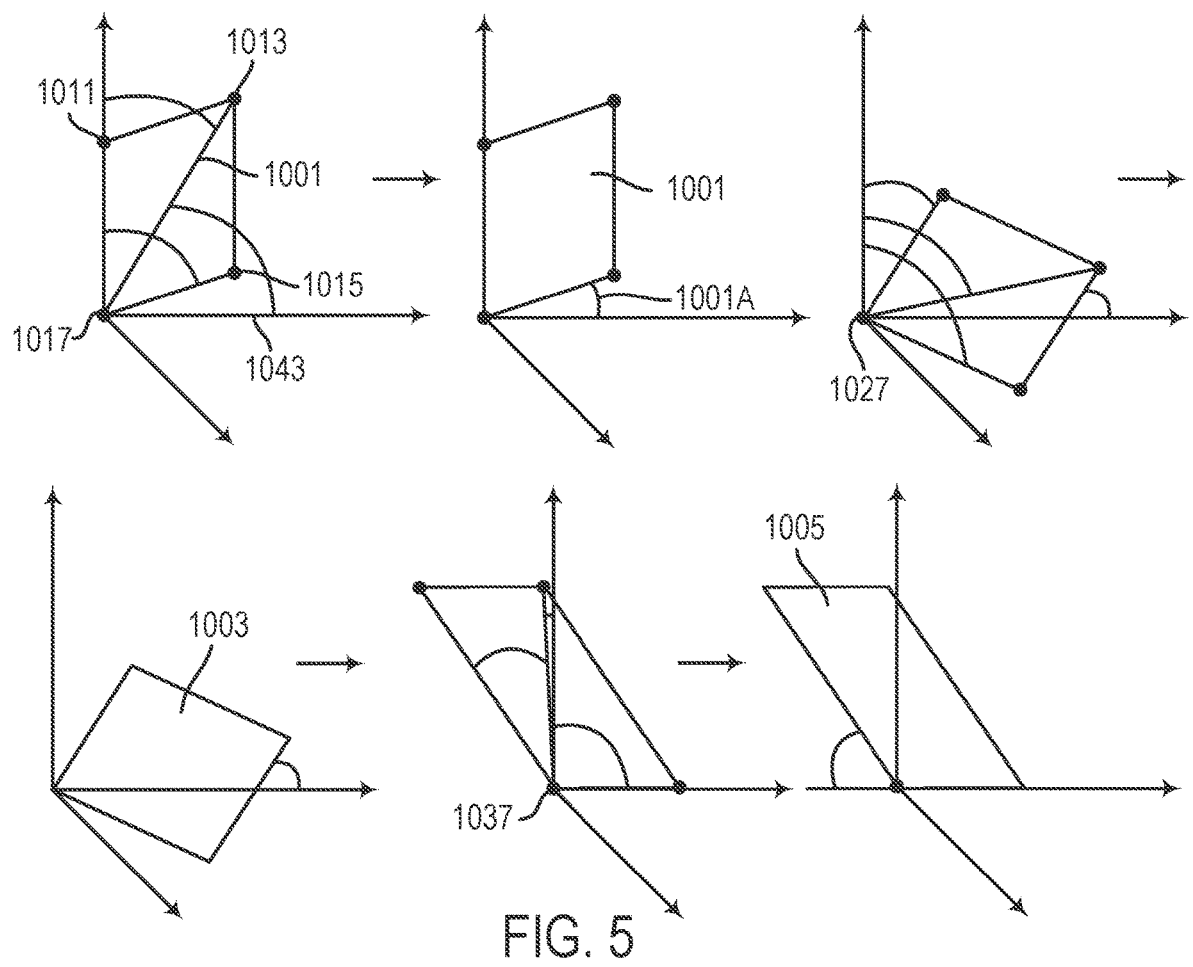

Referring now to FIG. 5, aligned surface point sectors 138 including surface points determined previously (see FIG. 3) can include features that can include possible walls 1001/1003/1005. To determine if any wall-like features are included in the dataset, a conventional polygon-forming algorithm such as, for example, but not limited to, convex hull, as described herein, can be used. Using, for example, a convex hull algorithm, origin 1017/1027/1037 can be chosen from a group of points that could represent a feature. Points that lie in the space relatively close to origin 1017, for example, points 1011/1013/1015 can each be examined. Whichever point is associated with the smallest angle from the vertical axis is chosen as a first corner of a polygon that will result from the analysis. The next point is chosen based on the next smallest angle. The first corner is connected to the next point. The next point is chosen based on the next smallest angle and is connected to the previously determined point. Finally, the last chosen point is connected to the origin to form a polygon. Angle 1001A that the polygon makes with x-axis 1043 can be compared to a pre-selected threshold value. If angle 1001A is greater than the absolute value of the threshold angle, the polygon is categorized as a wall feature. If angle 1001A is less than or equal to the absolute value of the threshold, the polygon is categorized as not a wall feature. Examples of other possible wall features are shown in FIG. 5. The threshold angle can include, but is not limited to including, |45°| from horizontal.

Figure 6:
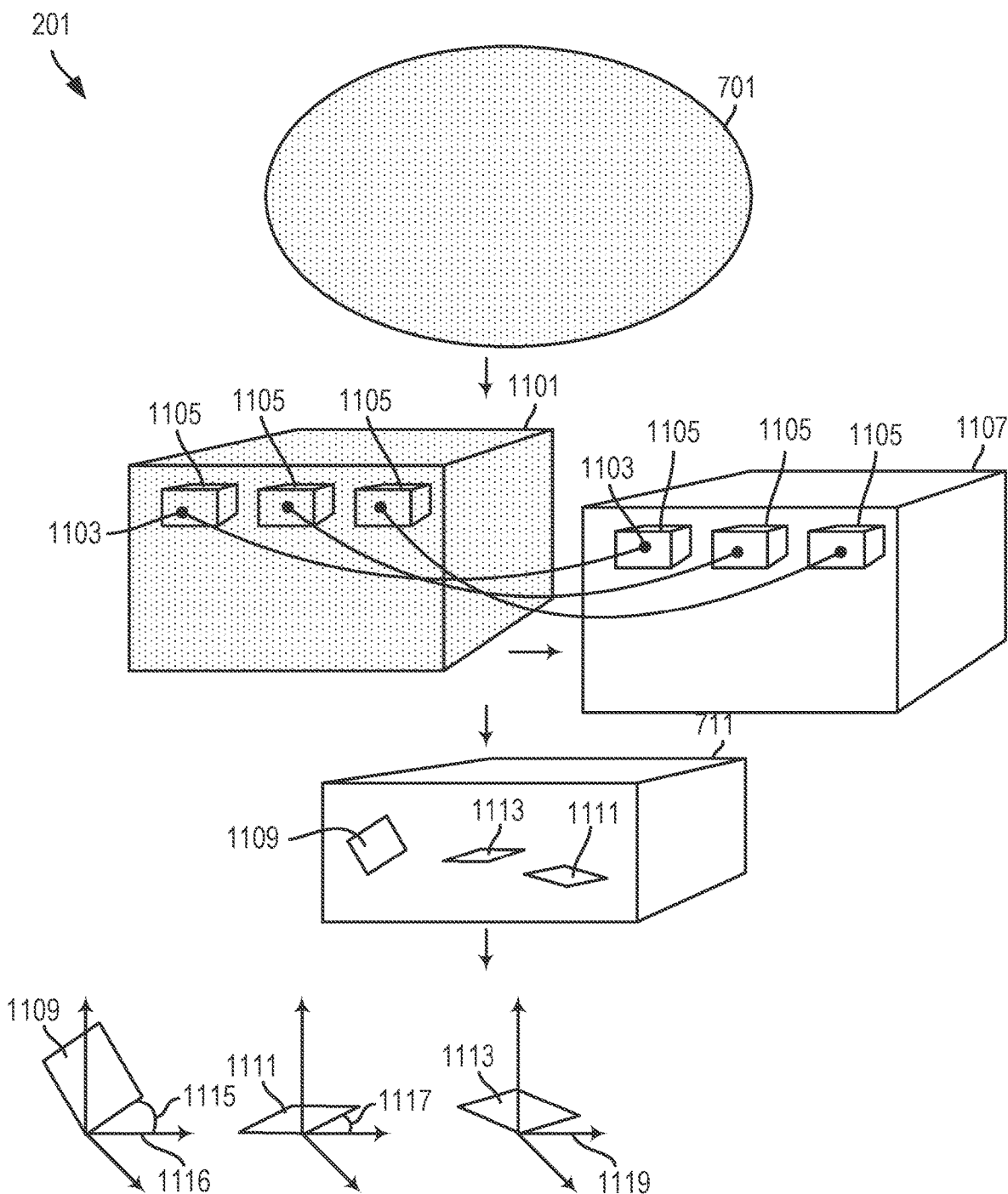
FIG. 6 is a pictorial representation of the process of extracting walls from aerial PC data of the present teachings.

Referring now to FIG. 6, filter 201 can be applied to aerial data 701 to create a uniform grid of points. For example, but not limited to, a voxel filter can be applied. Voxels 1105 can be evaluated as discussed herein to determine one representative point 1103 for each voxel, creating grid 1107. The convex hull process, or any process that can determine shapes from point cloud data, can be applied to filtered aerial data 711 to sort out possible aerial features 1101 (FIG. 1A), for example, but not limited to, roof and surface features 1109/1111/1113. Angles 1115/1117/1119 with a horizontal axis can be evaluated with respect to a threshold angle, and shapes whose angle exceeds the threshold angle are not used for further analysis because those shapes are not likely to be roofs or ground surfaces. For example, angle 1115 of shape 1109 with respect to horizontal axis 1116, if determined to be greater that the absolute value of the threshold angle, would cause shape 1109 to be eliminated from further analysis. Likewise with shapes 1111/1113 and angles 1117/1119. In some configurations, the threshold angle can include |15°| from horizontal. Features that are elevated with respect to each other can represent roofs. For example, feature 1117 elevated with respect to feature 1113, can be used to estimate the location of connected features 1118 (FIG. 1A) such as, but not limited to, walls, by connecting the corners of feature 1117 with surface points from surface features such as feature 1113. Wall features located in ground data 601 (FIG. 1A) can be registered to wall features located in aerial data 701. Any of conventional methods such as the generalized Iterative Closest Point (ICP) algorithm, Normal-Distribution Transform, Fast Point-Feature Histograms, and 4-Points Congruent Sets, can be used. The transformation determined from registration can be applied to ground data 601 (FIG. 1A).

Figure 7:
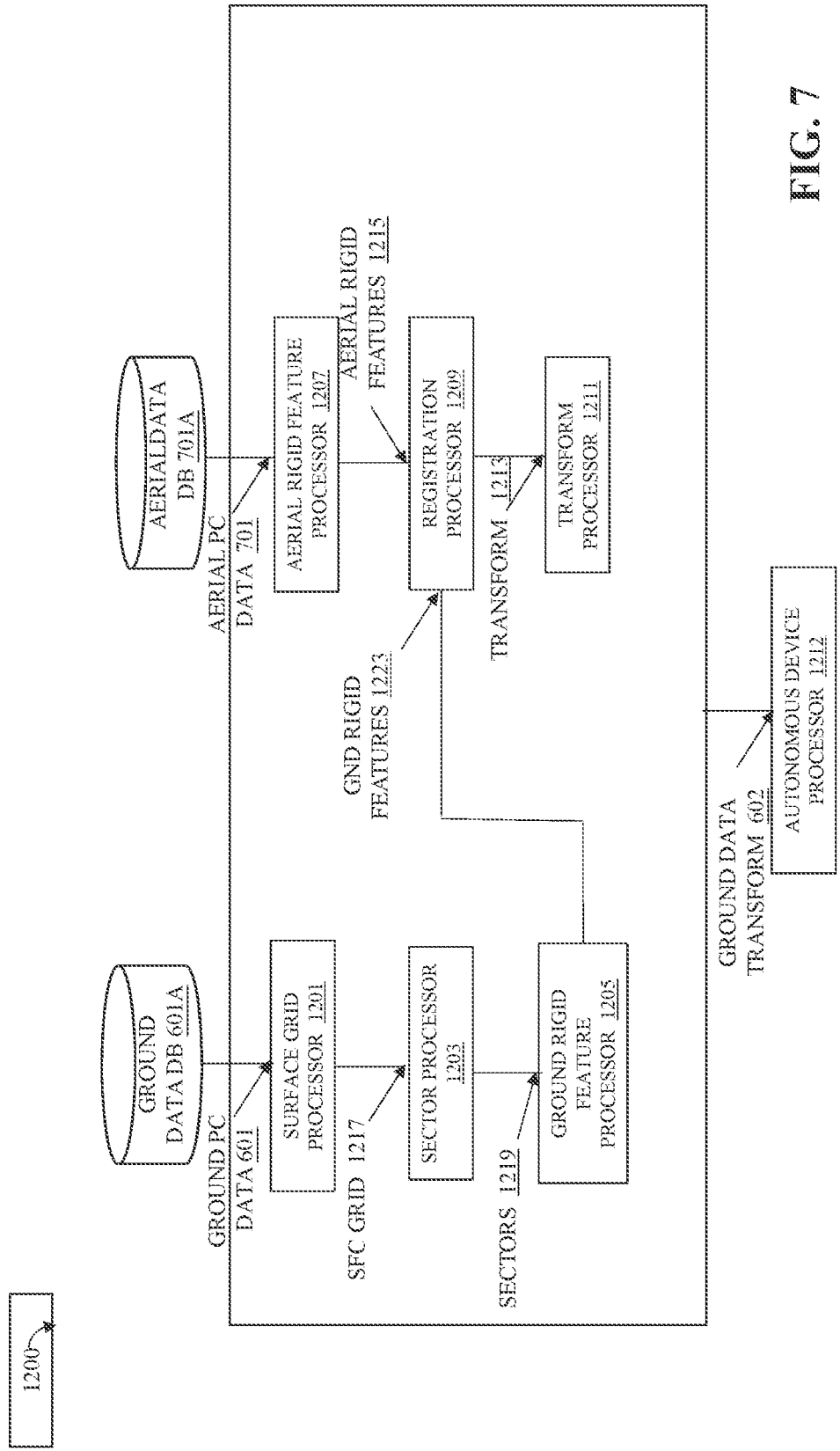
FIG. 7 is a schematic block diagram of the system of the present teachings for aerial-ground registration.

Referring now to FIG. 7, system 1200 for combining aerial point cloud data 701 and ground-based point cloud data 601 can include surface ground processor 1201 creating surface grid 1217 from ground PC data 701. Surface grid 1217 can include surfaces located in ground PC data 601. Surface ground processor 1201 can receive ground PC data 601 and provide surface grid 1217 to sector processor 1203. Sector processor 1203 can break surface grid 1217 into sectors 1219. Sectors 1219 can be large enough to include a representative number of points, but not too large so that processing time becomes an issue. Thus, sector size 1219 can vary with the density of ground PC data 601. Sector processor 1203 can align unaligned sectors within surface grid 1217, and can supply aligned sectors 1219 to ground feature processor 1215. Ground feature processor 1205 can locate ground rigid features 1223 within aligned sectors 1219, and supply ground rigid features 1223 to registration processor 1209. Aerial rigid feature processor 1207 can receive aerial PC data 701 locate aerial rigid features 1215, and supply aerial rigid features 1215 to registration process 1209. Registration process 1209 can register ground rigid features 1223 to aerial rigid features 1215, can determine transform 1213 from that process, and can supply transform 1213 to transform processor 1211. Transform processor 1211 can apply transform 1213 to ground PC data 601, and can provide ground PC data transform 602 to autonomous processor 1212. In some configurations, the ground rigid features can in include walls. In some configurations, the aerial rigid features can include roofs and surfaces. System 1200 can optionally include a filter filtering aerial PC data 701 and ground PC data 701. The filter can optionally include a voxel filter.

Continuing to refer to FIG. 7, sector processor 1203 can optionally include computer code executing the steps of (a) if there are more of the sectors to align, (b) choosing candidate adjacent sectors, and (c) determining a minimum distance between points in the adjacent sectors. (d) If the minimum distance is less than or equal to a first threshold, sector processor 1203 can include marking the candidate adjacent sectors as aligned and returning to (b). (e) If the minimum distance is greater than the first threshold, sector processor 1203 can include taking the average distance between all points in the adjacent sectors. (f) If the average distance is less than or equal to a second threshold, sector processor 1203 can include marking the candidate adjacent sectors as aligned and returning to (b). (g) If the average distance is greater than the second threshold, (1) sector processor 1203 can include determining coordinates for each corner of each possibly misaligned sector and (2) determining a transform for each corner of each possibly misaligned sector. (h) Sector processor 1203 can include determining distances between the corners of the possibly misaligned sector based on the coordinates, and (i) determining a relationship between the corner distances in adjacent corners. The relationship can be associated with the line connecting the corners. (j) If the average is less than or equal to a third threshold, sector processor 1203 can include marking the candidate adjacent sectors as aligned and returning to (b). (k) If the average is greater than a third threshold, evaluating alignment between all adjacent sectors, (1) sorting the sectors based on the number of aligned neighbors, (m) choosing the sector from the sorted list of sectors that has the largest number, but not all, of aligned neighbors, and (n) applying the transform from the chosen sector to its non-aligned neighbor at adjacent corners. (o) If the non-aligned sector has another non-aligned neighbor, and if a corner of the non-aligned neighbor would be used for alignment with a same corner that is being aligned with the chosen sector, sector processor 1203 can include (1) averaging the transforms of the same corner, and (2) applying the averaged transform to the non-aligned sector. (p) If the non-aligned sector does not have another non-aligned neighbor, and if there are more sectors to align, sector processor 1203 can include returning to (b). (q) If a corner of the non-aligned neighbor would not be used for alignment with a same corner that is being aligned with the chosen sector, sector processor 1203 can include continuing sector processor at (o). The relationship can optionally include an average. Sector processor 1203 can optionally include identifying, as the relationship, a value representative of the distance between the two possibly misaligned sectors. Sectors 1218 can optionally include about a 50-150 m² range.

Figure 8:
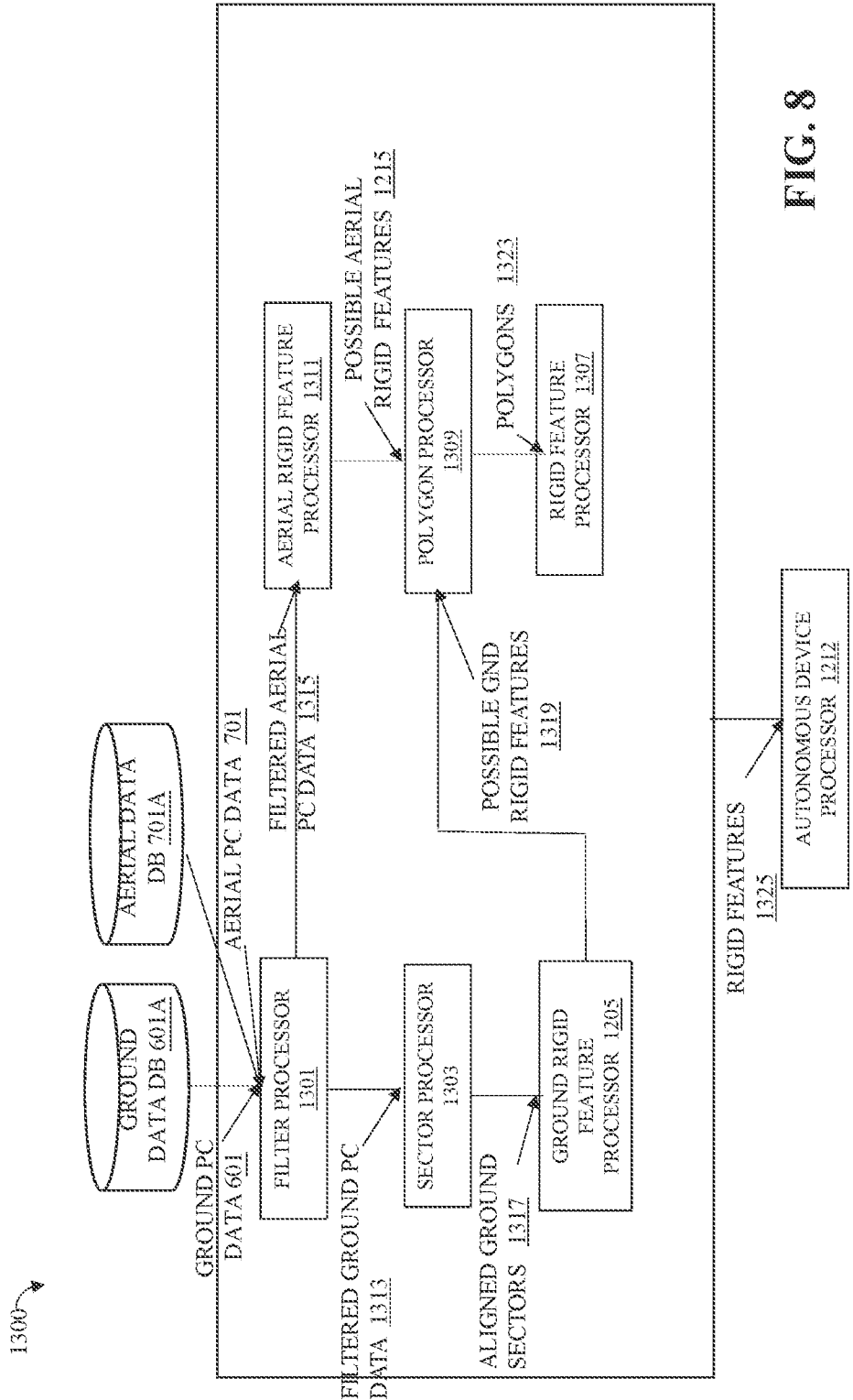
FIG. 8 is a schematic block diagram of the system of the present teachings for wall location in aerial and ground data.

Referring now to FIG. 8, system 1300 for locating walls in aerial point cloud (PC) data 701 and ground PC data 601 can include, but is not limited to including filter processor 1301 filtering aerial PC data 701 and ground PC data 601, and sector processor 1303 creating sectors 1317 of a pre-selected size within filtered aerial PC data 1315 and ground PC data 1313. Sector processor 1303 can align ground sectors 1313 in the ground PC data, and ground wall processor 1305 can identify possible walls 1319 in aligned ground PC sectors 1313. System 1300 can include aerial wall processor 1311 identifying possible roofs and possible surfaces 1321 in the aerial PC data, polygon processor 1309 forming polygons 1323 around possible walls 1319, and roofs/surfaces 1321, and wall processor 1307 forming walls 1323 from the roofs and surfaces and providing them to autonomous device processor 1212. Filter processor 1301 can optionally include downsampling ground PC data 601. Filter processor 1301 can optionally include a voxel filter filtering ground PC data 601.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on different computers. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for registration of three-dimensional (3D) ground point cloud (PC) data to 3D aerial PC data for vehicle navigation, the method comprising:
    locating surfaces in the 3D ground PC data;
    dividing the 3D ground PC data with located surfaces into members of a sector set;
    aligning the members with each other;
    locating like features in the 3D aerial PC data and the aligned members of the sector set;
    registering the like features in the 3D ground PC data with the 3D aerial PC data;
    creating a transform based on the registration;
    wherein aligning the sectors with each other comprises:
        determining coordinates and coordinate transforms for each corner of each of the members of the sector set;
        determining, based on the coordinates, a first member of the members, the first member being adjacent to and not aligned with a second member of the members; and
        applying the coordinate transforms associated with the first member to the coordinates of the second member; and
    applying a combination of multiple of the coordinate transforms to the second member based at least on a third member of the members.

2. The method as in claim 1 further comprising filtering the 3D aerial PC data and the 3D ground PC data.

3. The method as in claim 1 further comprising filtering the 3D aerial PC data and the 3D ground PC data using a voxel filter.

4. The method as in claim 1 wherein the aligning of the sectors comprises:
    determining if the members are adjacent based on at least on a distance between selected data points between the members;
    determining if the members are aligned based at least on coordinates of each of the corners of each of the members;
    determining a coordinate transform for each of the corners of each of the members; and applying the coordinate transforms associated with a first member of the members to a second member of the members based at least on whether the first member and the second member are adjacent and misaligned.

5. The method as in claim 4 wherein determining if members are aligned comprises:
   determining distances between the corners of the members based on the coordinates;
   determining a relationship between the corner distances in adjacent corners of the members, the relationship being associated with a line connecting the corners;
   if the relationship yields a value that is less than or equal to a third threshold, marking the members as aligned;
   if the relationship yields the value that is greater than the third threshold, evaluating alignment between all adjacent members; and
   sorting the members based on a number of aligned of the members that are also adjacent to the members.

6. The method as in claim 5 further comprising:
   averaging the coordinate transforms of a first corner of a fourth member not aligned with and adjacent to a fifth member, the fifth member being not aligned, with the coordinate transform of a second corner of the fifth member, if the second corner of the fifth member would be used for alignment with third corner that is being aligned with the first member; and
   applying the averaged transform to the fourth member.

7. The method as in claim 1 wherein each of the members comprises a substantially 50-150 m² range.

8. The method of navigating an autonomous vehicle according to claim 1 further comprising compiling a scene based on the transform for autonomous vehicle navigation.

9. The method of claim 8 further comprising using the scene by an autonomous vehicle for navigation.

10. A system for point cloud (PC) registration of ground PC data to aerial PC data, the system comprising:
    a surface grid processor configured to create a surface grid from the ground PC data, including surfaces located in the ground PC data;
    a sector processor configured to break the surface grid into sectors and align the sectors, defining aligned sectors;
    a ground rigid feature processor configured to locate ground rigid features within the aligned sectors;
    an aerial rigid features processor configured to locate aerial rigid features within the aerial PC data;
    a registration processor configured to register the ground rigid features to the aerial rigid features, defining a transform; and
    a transformation processor configured to transform the ground PC data according to the transform;
    wherein the sector processor comprises computer code configured for executing instructions for:
    (a) choosing candidate adjacent sectors;
    (b) determining a minimum distance between points in the candidate adjacent sectors;
    (c) if the minimum distance is less than or equal to a first threshold, defining the candidate adjacent sectors as aligned sectors and returning to (a);
    (d) if the minimum distance is greater than the first threshold, calculating an average distance among all points in the candidate adjacent sectors;
    (e) if the average distance is less than or equal to a second threshold, defining the candidate adjacent sectors as aligned sectors and returning to (a);
    (f) if the average distance is greater than the second threshold,
    (1) determining coordinates for each of the corners of each of the candidate adjacent sectors; and
    (2) determining a transform for each of the corners of each of the candidate adjacent sectors;
    (3) determining distances among each of the corners of each of the candidate adjacent sectors based on the coordinates;
    (4) determining a relationship among each of the distances among each of the corners of each of the candidate adjacent sectors in adjacent corners, the relationship being associated with a line connecting the corners of each of the candidate adjacent sectors;
    (g) if the average distance is less than or equal to a third threshold, defining the candidate adjacent sectors as aligned sectors and returning to (a);
    (i) if the average distance is greater than the third threshold, evaluating alignment among all adjacent sectors;
    (k) sorting the adjacent sectors based on a number of aligned neighbors forming a sorted list of sectors;
    (l) choosing one of the adjacent sectors from the sorted list of sectors that has a largest number, but not all, of aligned neighbors and defining a chosen sector;
    (m) applying the transform from the chosen sector to a non-aligned neighbor at an adjacent one of the corners of each of the candidate adjacent sectors;
    (n) if the non-aligned sector has another non-aligned neighbor, and if a corner of the non-aligned neighbor would be used for alignment with a same corner that is being aligned with the chosen sector,
    (1) averaging the transforms of the same corner; and
    (2) applying the averaged transform to the non-aligned sector;
    (o) if the non-aligned sector does not have another non-aligned neighbor, and if there are more sectors to align, returning to (a); and
    (p) if one of the corners of the non-aligned neighbor would not be used for alignment with a same of the corners that is being aligned with the chosen sector, continuing at (n).

11. The system as in claim 10 wherein the ground rigid features comprise walls.

12. The system as in claim 10 wherein the aerial rigid features comprise roofs and rigid surfaces.

13. The system as in claim 10 further comprising a filter configured to filter the aerial PC data and the ground PC data.

14. The system as in claim 10 further comprising a voxel filter configured to filter the aerial PC data and the ground PC data.

15. The system as in claim 10 wherein the relationship comprises an average.

16. The system as in claim 10 wherein the sector processor is configured to identify, as the relationship, a value representative of a distance between the two of the possibly misaligned sectors.

17. A method for registration of three-dimensional (3D) ground point cloud (PC) data to 3D aerial PC data for vehicle navigation, the method comprising:
    locating surfaces in the 3D ground PC data;
    dividing the 3D ground PC data with located surfaces into members of a sector set;
    aligning the members with each other;
    locating like features in the 3D aerial PC data and the aligned members of the sector set;
    registering the like features in the 3D ground PC data with the 3D aerial PC data; and
    creating a transform based on the registration wherein said aligning of the sectors comprises:
  determining if the members are adjacent based on at least on a distance between selected data points between the members;
  determining if the members are aligned based at least on coordinates of each of the corners of each of the members;
  determining a coordinate transform for each of the corners of each of the members; and
  applying the coordinate transforms associated with a first member of the members to a second member of the members based at least on whether the first member and the second member are adjacent and misaligned; and
  wherein said determining if members are aligned comprises:
  determining distances between the corners of the members based on the coordinates;
  determining a relationship between the corner distances in adjacent corners of the members, the relationship being associated with a line connecting the corners;
  if the relationship yields a value that is less than or equal to a third threshold, marking the members as aligned;
  if the relationship yields the value that is greater than the third threshold, evaluating alignment between all adjacent members; and
  sorting the members based on a number of aligned of the members that are also adjacent to the members.

18. The method as in claim 17 wherein aligning the sectors with each other comprises:
  determining coordinates and coordinate transforms for each corner of each of the members of the sector set;
  determining, based on the coordinates, a first member of the members, the first member being adjacent to and not aligned with a second member of the members; and
  applying the coordinate transforms associated with the first member to the coordinates of the second member.

19. The method as in claim 18 further comprising applying a combination of multiple of the coordinate transforms to the second member based at least on a third member of the members.

20. The method as in claim 17 further comprising filtering the 3D aerial PC data and the 3D ground PC data.

21. The method as in claim 17 further comprising filtering the 3D aerial PC data and the 3D ground PC data using a voxel filter.

22. The method as in claim 17 wherein determining if members are aligned comprises:
  determining distances between the corners of the members based on the coordinates;
  determining a relationship between the corner distances in adjacent corners of the members, the relationship being associated with a line connecting the corners;
  if the relationship yields a value that is less than or equal to a third threshold, marking the members as aligned;
  if the relationship yields the value that is greater than the third threshold, evaluating alignment between all adjacent members; and
  sorting the members based on a number of aligned of the members that are also adjacent to the members.

23. The method as in claim 22 further comprising:
  averaging the coordinate transforms of a first corner of a fourth member not aligned with and adjacent to a fifth member, the fifth member being not aligned, with the coordinate transform of a second corner of the fifth member, if the second corner of the fifth member would be used for alignment with third corner that is being aligned with the first member; and
  applying the averaged transform to the fourth member.

24. The method as in claim 17 wherein each of the members comprises a substantially 50-150 m$^2$ range.

25. The method of navigating an autonomous vehicle according to claim 17 further comprising compiling a scene based on the transform for autonomous vehicle navigation.

26. The method of claim 25 further comprising using the scene by an autonomous vehicle for navigation.

27. A method for registration of three-dimensional (3D) ground point cloud (PC) data to 3D aerial PC data for vehicle navigation, the method comprising:
  locating surfaces in the 3D ground PC data;
  dividing the 3D ground PC data with located surfaces into members of a sector set;
  aligning the members with each other;
  locating like features in the 3D aerial PC data and the aligned members of the sector set;
  registering the like features in the 3D ground PC data with the 3D aerial PC data; and
  creating a transform based on the registration;
  wherein each of the members comprises a substantially 50-150 m$^2$ range.

28. The method as in claim 27 wherein aligning the sectors with each other comprises:
  determining coordinates and coordinate transforms for each corner of each of the members of the sector set;
  determining, based on the coordinates, a first member of the members, the first member being adjacent to and not aligned with a second member of the members; and
  applying the coordinate transforms associated with the first member to the coordinates of the second member.

29. The method as in claim 28 further comprising applying a combination of multiple of the coordinate transforms to the second member based at least on a third member of the members.

30. The method as in claim 27 further comprising filtering the 3D aerial PC data and the 3D ground PC data.

31. The method as in claim 27 further comprising filtering the 3D aerial PC data and the 3D ground PC data using a voxel filter.

32. The method as in claim 27 wherein the aligning of the sectors comprises:
  determining if the members are adjacent based on at least on a distance between selected data points between the members;
  determining if the members are aligned based at least on coordinates of each of the corners of each of the members;
  determining a coordinate transform for each of the corners of each of the members; and
  applying the coordinate transforms associated with a first member of the members to a second member of the members based at least on whether the first member and the second member are adjacent and misaligned.

33. The method as in claim 32 wherein determining if members are aligned comprises:
  determining distances between the corners of the members based on the coordinates;
  determining a relationship between the corner distances in adjacent corners of the members, the relationship being associated with a line connecting the corners;
  if the relationship yields a value that is less than or equal to a third threshold, marking the members as aligned;

if the relationship yields the value that is greater than the third threshold, evaluating alignment between all adjacent members; and sorting the members based on a number of aligned of the members that are also adjacent to the members.

34. The method as in claim 33 further comprising:

averaging the coordinate transforms of a first corner of a fourth member not aligned with and adjacent to a fifth member, the fifth member being not aligned, with the coordinate transform of a second corner of the fifth member, if the second corner of the fifth member would be used for alignment with third corner that is being aligned with the first member; and applying the averaged transform to the fourth member.

35. The method of navigating an autonomous vehicle according to claim 27 further comprising compiling a scene based on the transform for autonomous vehicle navigation.

36. The method of claim 35 further comprising using the scene by an autonomous vehicle for navigation.

* * * * *